(12) United States Patent
Kruempelmann et al.

(10) Patent No.: US 12,265,543 B1
(45) Date of Patent: Apr. 1, 2025

(54) INTELLIGENT CLIENT COPY TOOL

(71) Applicant: SAP SE, Walldorf (DE)

(72) Inventors: Wulf Kruempelmann, Altlussheim (DE); Dominik Ofenloch, Lampertheim (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/517,773

(22) Filed: Nov. 22, 2023

(51) Int. Cl.
*G06F 16/2455* (2019.01)

(52) U.S. Cl.
CPC .............................. *G06F 16/24565* (2019.01)

(58) Field of Classification Search
CPC ................................................ G06F 16/24565
USPC .......................................................... 707/703
See application file for complete search history.

(56) References Cited

U.S. PATENT DOCUMENTS

| 10,417,212 | B1 * | 9/2019 | Hensley | G06F 16/21 |
| 2002/0138497 | A1 * | 9/2002 | Chen | G06F 16/24565 |
| 2003/0204540 | A1 * | 10/2003 | Rielau | G06F 16/24553 |
| 2006/0212496 | A1 * | 9/2006 | Romine | G06F 16/288 |
| 2009/0012974 | A1 * | 1/2009 | Cassidy | G06F 16/86 |
| 2024/0086387 | A1 * | 3/2024 | Doole | G06F 16/2282 |

* cited by examiner

*Primary Examiner* — Cam Linh T Nguyen
(74) *Attorney, Agent, or Firm* — Mintz Levin Cohn Ferris Glovsky and Popeo, P.C.

(57) ABSTRACT

Arrangements for an intelligent client copy tool are provided. In a client copy procedure, access to a target client may be locked and all target data associated with the target client may be deleted. A before trigger for execution before a modifying operation on a database table may be defined. The trigger may be executed and, based on the trigger identifying a query associated with the modifying operation, access to the database table may be locked and an insert operation may be executed. Then, the trigger may be deleted. Thereafter, the modifying operation on the target client may be performed and access to the database table unlocked. A database view of the database table, including pointers to the source client, may be generated. Nonstatic data may be copied from the source client to the target client using the insert operation. After the copying, the target client may be unlocked.

20 Claims, 4 Drawing Sheets

Country_Definition_Table

| Client | Country Code | Description |
|---|---|---|
| 100 | US | United States |
| 200 | | |

INTELLIGENT CLIENT COPY TOOL

TECHNICAL FIELD

The subject matter described herein relates generally to data processing and more specifically to an intelligent client copy tool.

BACKGROUND

A client copy tool may be used in different scenarios to copy data from one client to another. For example, the client copy tool may be used for refreshing test systems with production data, building new test clients, checking foreign keys, restoring broken clients, and/or the like. A copy of an entire client may cause over several hundred gigabytes of data to be copied from one client to another. Oftentimes, a large portion of this data is untouched after the copy operation. Such a process requires a lot of space and runtime, making it resource heavy and difficult to handle.

SUMMARY

Methods, systems, and articles of manufacture, including computer program products, are provided for an intelligent client copy tool. In one aspect, there is provided a system including at least one processor and at least one memory. The at least one memory can store instructions that cause operations when executed by the at least one processor. The operations may include: locking access to a target client; deleting all target data associated with the target client; defining a trigger that is executed before a modifying operation on a database table associated with a source client or the target client, and the database table may include static data; and executing the trigger. Based on the trigger identifying a query associated with the modifying operation, the operations may include: locking access to the database table; executing an insert operation to insert source data of the source client into the target client; deleting the trigger. performing the modifying operation on the target client; and unlocking access to the database table. The operations may further include: generating a database view of the database table, and the database view may include one or more pointers to the source client; copying nonstatic data from the source client to the target client using the insert operation; and unlocking access to the target client after the copying.

In some variations, the trigger may include a structured query language BEFORE trigger.

In some variations, the modifying operation may include an insert operator, an update operator, or a delete operator.

In some variations, locking access to the database table may include restricting the database table from data interactions in the source client and in the target client.

In some variations, the database view of the database table may point to a table in the source client for both the source client and the target client.

In some variations, the static data may include application data or log data.

In some variations, the nonstatic data may include one or more of: system data, customizing data, or master data.

In some variations, deleting the trigger may include automatically deleting the trigger after a first execution of the trigger.

In another aspect, there is provided a method for an intelligent client copy procedure. The method may include: locking access to a target client; deleting all target data associated with the target client; defining a trigger that is executed before a modifying operation on a database table associated with a source client or the target client, and the database table may include static data; and executing the trigger. Based on the trigger identifying a query associated with the modifying operation, the method may include: locking access to the database table; executing an insert operation to insert source data of the source client into the target client; deleting the trigger. performing the modifying operation on the target client; and unlocking access to the database table. The method may further include: generating a database view of the database table, and the database view may include one or more pointers to the source client; copying nonstatic data from the source client to the target client using the insert operation; and unlocking access to the target client after the copying.

In some variations, one or more of the features disclosed herein including the following features can optionally be included in any feasible combination. In some variations, the trigger may include a structured query language BEFORE trigger.

In some variations, the modifying operation may include an insert operator, an update operator, or a delete operator.

In some variations, locking access to the database table may include restricting the database table from data interactions in the source client and in the target client.

In some variations, the database view of the database table may point to a table in the source client for both the source client and the target client.

In some variations, the static data may include application data or log data.

In some variations, the nonstatic data may include one or more of: system data, customizing data, or master data.

In some variations, deleting the trigger may include automatically deleting the trigger after a first execution of the trigger.

In another aspect, there is provided a computer program product that includes a non-transitory computer readable medium. The non-transitory computer readable medium may store instructions that cause operations when executed by at least one data processor. The operations may include: locking access to a target client; deleting all target data associated with the target client; defining a trigger that is executed before a modifying operation on a database table associated with a source client or the target client, and the database table may include static data; and executing the trigger. Based on the trigger identifying a query associated with the modifying operation, the operations may include: locking access to the database table; executing an insert operation to insert source data of the source client into the target client; deleting the trigger. performing the modifying operation on the target client; and unlocking access to the database table. The operations may further include: generating a database view of the database table, and the database view may include one or more pointers to the source client; copying nonstatic data from the source client to the target client using the insert operation; and unlocking access to the target client after the copying.

In some variations, one or more of the features disclosed herein including the following features can optionally be included in any feasible combination. In some variations, the trigger may include a structured query language BEFORE trigger.

In some variations, the modifying operation may include an insert operator, an update operator, or a delete operator.

In some variations, deleting the trigger may include automatically deleting the trigger after a first execution of the trigger.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3 depicts an example database table operated upon by an intelligent client copy tool in accordance with some example embodiments.

When practical, similar reference numbers denote similar structures, features, or elements.

DETAILED DESCRIPTION

Aspects of the disclosure may provide an intelligent client copy tool optimized for increased performance, process automation, and data stability. For example, aspects of the disclosure may use database views to select the data in a source client instead of a target client, until data in the source client is changed. When the data in the source client or in the target client is changed, all data may be copied over to the target client before performing action on the data. Client copying may occur on data change request. These and various other arrangements will be discussed more fully below.

Figure 1:
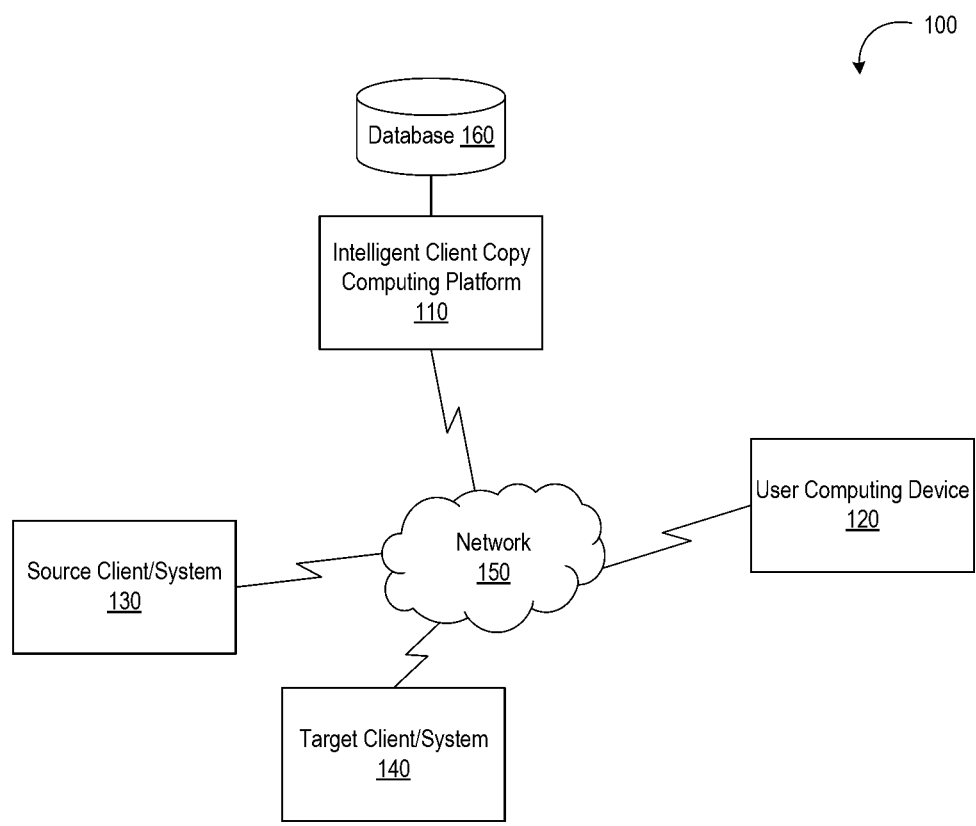
FIG. 1 depicts an illustrative computing environment for an intelligent client copy tool in accordance with some example embodiments.

FIG. 1 depicts an illustrative computing environment 100 for intelligent client copying in accordance with some example embodiments. Referring to FIG. 1, the computing environment 100 may include one or more computing devices and/or other computing systems. For example, computing environment 100 may include an intelligent client copy computing platform 110, a user computing device 120, a source client 130 (or system), a target client 140 (or system), and a database 160. Intelligent client copy computing platform 110 may include one or more computing devices configured to perform one or more of the functions described herein. Intelligent client copy computing platform 110 may replicate (e.g., copy) the data of one client (e.g., source client 130) in another client (e.g., target client 140). User computing device 120 may be a processor-based device including, for example, a smartphone, a tablet computer, a wearable apparatus, a virtual assistant, an Internet-of-Things (IoT) appliance, and/or the like. Database 160 may include, for example, a relational database, an in-memory database, a graph database, a key-value store, a document store, and/or the like. In some examples, the intelligent client copy computing platform 110 may maintain (e.g., store) various types of data, including static and nonstatic data (e.g., system data, customizing data, master data, application data, log data, and/or the like) in one or more database tables at a database 160 coupled with the intelligent client copy computing platform 110.

Referring again to FIG. 1, the intelligent client copy computing platform 110, the user computing device 120, the source client 130 (or system), the target client 140 (or system), and the database 160 may be communicatively coupled via a network 150. The network 150 may be a wired and/or wireless network including, for example, a wide area network (WAN), local area network (LAN), a virtual local area network (VLAN), the Internet, and/or the like. Meanwhile, the source client 130 and/or the target client 140 may be cloud-based systems hosted on one or more cloud-computing platforms.

Figure 2:
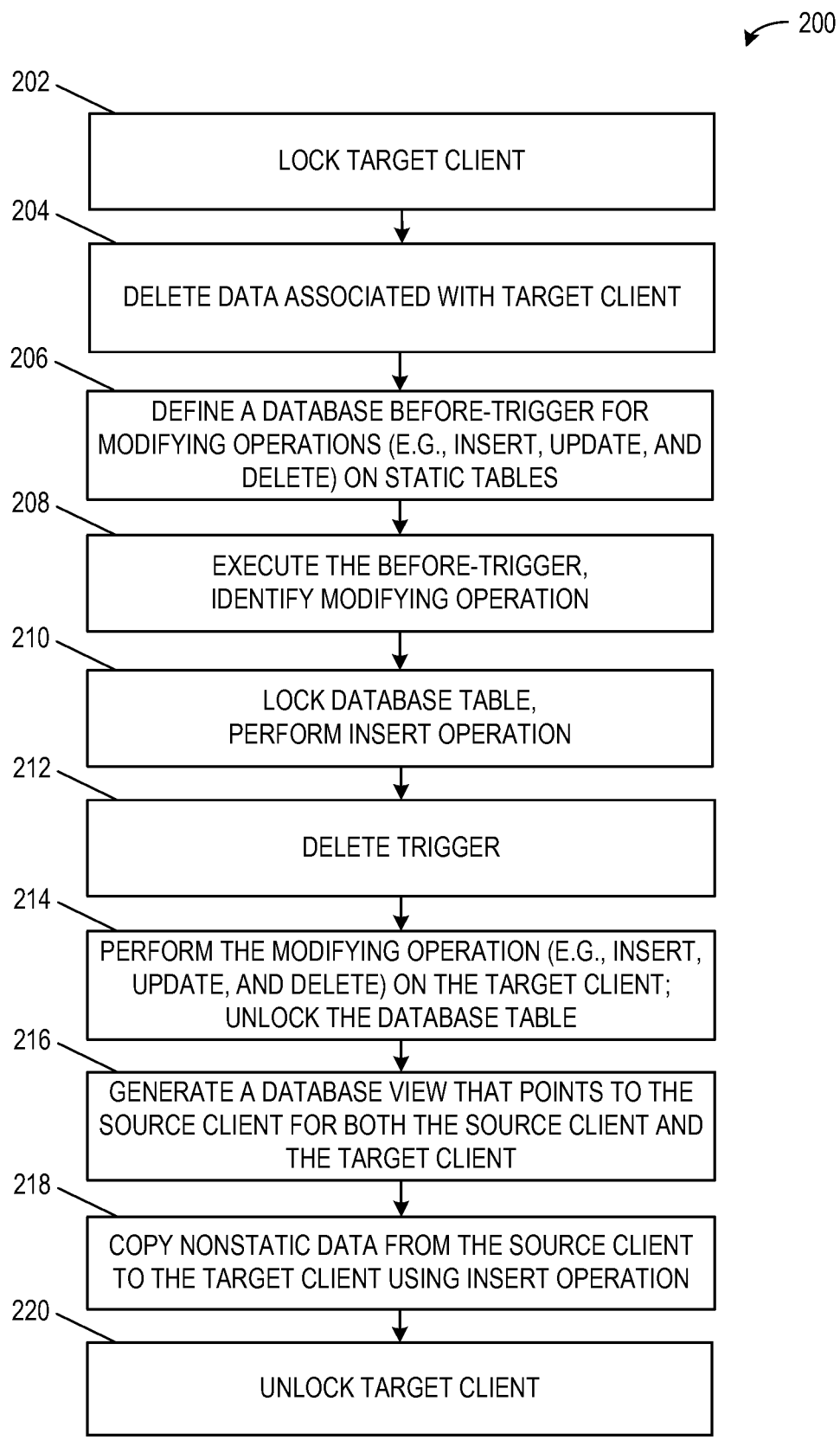
FIG. 2 depicts a flowchart illustrating a process for implementing an intelligent client copy tool in accordance with some example embodiments.

FIG. 2 depicts a flowchart illustrating a process 200 (e.g., client copy procedure) for implementing an intelligent client copy tool, in accordance with some example embodiments. Referring to FIGS. 1-3, the process 200 may be performed using an intelligent client copy computing platform 110.

Referring to FIG. 2, at step 202, intelligent client copy computing platform 110 may lock or otherwise restrict access to a target client (e.g., target client 140). For example, to avoid data inconsistencies, initial steps may be performed before starting a client copy procedure such as disconnecting and locking users (e.g., ending sessions of active users in the system, such as users of user computing device 120), suspending background jobs, or the like.

At step 204, intelligent client copy computing platform 110 may delete the entire target client (e.g., target client 140). For example, intelligent client copy computing platform 110 may delete all target data associated with the target client (e.g., target client 140). An entire deletion of the target client creates space to perform the copy operation.

With respect to static tables, intelligent client copy computing platform 110 may, at step 206, define or build a trigger that is executed before a modifying operation on a database table associated with a source client (e.g., source client 130) or the target client (e.g., target client 140). The tables in a client may be specified with delivery classes, which describe their behavior during delivery of a system.

Intelligent client copy computing platform 110 may distinguish between different types of data including, for example, system data, customizing data, master data, application data, and local log data. System data includes data delivered or released by a software vendor and is often static during the lifecycle of a client. Customizing data includes data created by customers when they customize their systems. During development of business processes, customizing data may change frequently, but is often static after setup. Master data includes data that may be valuable in running an organization. For example, master data may describe people (e.g., customers, employees, and suppliers), places (e.g., offices and locations), and things (e.g., products and assets), and is often static. Application data may include data that is stored in database tables and may change frequently (e.g., is nonstatic). Local log data may include data used for checking data changes and may also change frequently (e.g., is nonstatic).

The database trigger is automatically executed in response to certain events on a particular table or view in a database. For instance, at step 206, intelligent client copy computing platform 110 may create database before-operation triggers (e.g., a structured query language (SQL) BEFORE trigger, or other SAP compatible "before" trigger) that run before an insert, update, or delete operation, which might change the data in the database tables. Advantageously, the triggers do not slow down the system, as the tables they are set on are typically static. In addition, after a first execution of the trigger, the trigger would be deleted automatically, as discussed further herein.

At step 208, intelligent client copy computing platform 110 may execute the trigger. In some embodiments, the trigger may check if there is a modifying operator (e.g., an insert, update, or delete operator) coming from either a source client or a target client. Based on the trigger identifying a query associated with the modifying operation (e.g., including a modifying operator such as an insert, update, or delete operator) coming from either the source client or the target client, intelligent client copy computing platform 110 may, at step 210, lock the database table (or otherwise restrict access and data interactions in the table in both the source client and the target client). Thereafter, intelligent client copy computing platform 110 may execute an insert operation (e.g., SQL INSERT) to insert source data of the source client into the target client. For instance, intelligent client copy computing platform 110 may copy source data from the source client to the target client using an SQL INSERT statement (e.g., INSERT 'target-client' . . . <all fields of the table> into <tablename> FROM <tablename> WHERE client='source_client').

At step 212, intelligent client copy computing platform 110 may delete or drop the trigger. Advantageously, intelligent client copy computing platform 110 may automatically delete the trigger after a first execution of the trigger.

At step 214, intelligent client copy computing platform 110 may perform the modifying operation (e.g., the insert, update, or delete operation) on the target client. Then, intelligent client copy computing platform 110 may unlock access to the database table (e.g., restoring access and/or data interactions).

At step 216, intelligent client copy computing platform 110 may generate a database view of the database table. For static tables (e.g., tables including static data), the database view may include one or more pointers (or other reference) to the source client. In some examples, the database view may point to a table in the source client for both the source client and the target client. FIG. 3 depicts an example database table 300 operated upon by an intelligent client copy tool in accordance with some example embodiments. Referring to FIG. 3, a pointer 302 may point from client "200" to client "100." As such, client copy computing platform 110 may avoid inserting the second record (e.g., client "200") by forwarding the data from client "200" to client "100." For example, the "Client" field may be changed from "200" to "100," and data may be selected from client "200," via the pointer. It will be appreciated that other and/or different pointers or other references may also be provided.

In some embodiments, for nonstatic tables (e.g., tables including nonstatic data), a trigger may not be defined or used because it is expected that these tables might change (e.g., sometimes frequently). Returning to FIG. 2, at step 218, intelligent client copy computing platform 110 may copy such nonstatic data from the source client to the target client using the SQL INSERT statement (e.g., INSERT 'target-client' . . . <all fields of the table> into <tablename> FROM <tablename> WHERE client='source_client').

At step 220, intelligent client copy computing platform 110 may, after the copying, unlock access to the target client (e.g., restoring access and/or data interactions).

Advantageously, among other things, the amount of data being copied in the client copy procedure is kept to a minimum, a large amount of database space (e.g., up to several hundred gigabytes) is saved, the duration of the copy procedure is greatly reduced, and data integrity remains stable.

Figure 4:
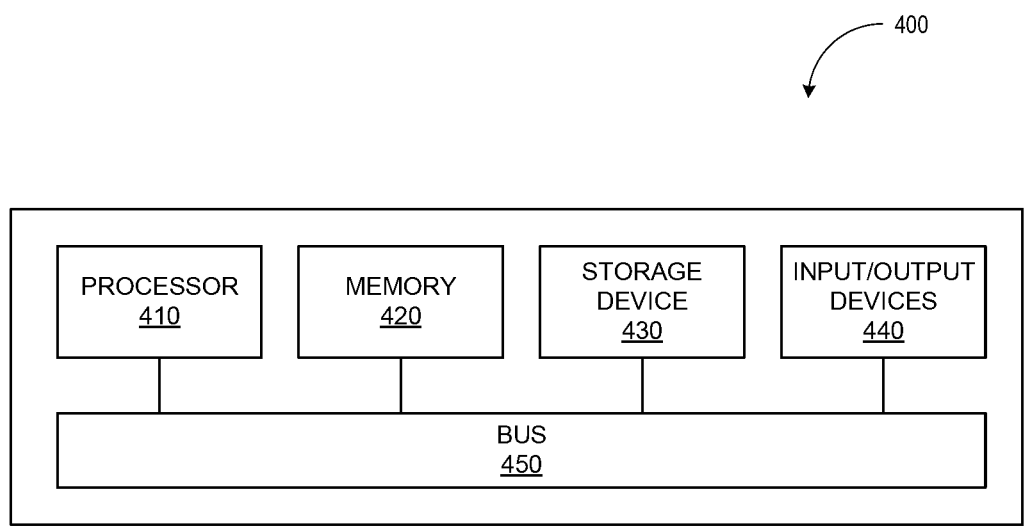
FIG. 4 depicts a block diagram illustrating a computing system, in accordance with some example embodiments.

FIG. 4 depicts a block diagram illustrating a computing system 400 consistent with implementations of the current subject matter. Referring to FIGS. 1-4, the computing system 400 can be used to implement the intelligent client copy computing platform 110 and/or any components therein.

As shown in FIG. 4, the computing system 400 can include a processor 410, a memory 420, a storage device 430, and input/output devices 440. The processor 410, the memory 420, the storage device 430, and the input/output devices 440 can be interconnected via a system bus 450. The processor 410 is capable of processing instructions for execution within the computing system 400. Such executed instructions can implement one or more components of, for example, the intelligent client copy computing platform 110. In some implementations of the current subject matter, the processor 410 can be a single-threaded processor. Alternately, the processor 410 can be a multi-threaded processor. The processor 410 is capable of processing instructions stored in the memory 420 and/or on the storage device 430 to display graphical information for a user interface provided via the input/output device 440.

The memory 420 is a computer readable medium such as volatile or non-volatile that stores information within the computing system 400. The memory 420 can store data structures representing configuration object databases, for example. The storage device 430 is capable of providing persistent storage for the computing system 400. The storage device 430 can be a solid-state device, a floppy disk device, a hard disk device, an optical disk device, a tape device, and/or any other suitable persistent storage means. The input/output device 440 provides input/output operations for the computing system 400. In some implementations of the current subject matter, the input/output device 440 includes a keyboard and/or pointing device. In various implementations, the input/output device 440 includes a display unit for displaying graphical user interfaces.

According to some implementations of the current subject matter, the input/output device 440 can provide input/output operations for a network device. For example, the input/output device 440 can include Ethernet ports or other networking ports to communicate with one or more wired and/or wireless networks (e.g., a local area network (LAN), a wide area network (WAN), the Internet).

In some implementations of the current subject matter, the computing system 400 can be used to execute various interactive computer software applications that can be used for organization, analysis and/or storage of data in various (e.g., tabular) format (e.g., Microsoft Excel®, and/or any other type of software). Alternatively, the computing system 400 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be stand-alone computing products and/or functionalities. Upon activation within the applications, the functionalities can be used to generate the user interface provided via the input/output device 440. The user interface can be generated and presented to a user by the computing system 400 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising:
at least one data processor; and
at least one memory storing instructions, which when executed by the at least one data processor, result in operations comprising:
locking access to a target client;
deleting all target data associated with the target client;
defining a trigger that is executed before a modifying operation on a database table associated with a source client or the target client, wherein the database table comprises static data;
executing the trigger, wherein, based on the trigger identifying a query associated with the modifying operation:
locking access to the database table;
executing an insert operation to insert source data of the source client into the target client;

deleting the trigger;
performing the modifying operation on the target client; and
unlocking access to the database table;
generating a database view of the database table, wherein the database view comprises one or more pointers to the source client;
copying nonstatic data from the source client to the target client using the insert operation; and
unlocking access to the target client after the copying.

Example 2: The system of Example 1, wherein the trigger comprises a structured query language BEFORE trigger.

Example 3: The system of any of Examples 1-2, wherein the modifying operation comprises an insert operator, an update operator, or a delete operator.

Example 4: The system of any of Examples 1-3, wherein locking access to the database table comprises restricting the database table from data interactions in the source client and in the target client.

Example 5: The system of any of Examples 1-4, wherein the database view of the database table points to a table in the source client for both the source client and the target client.

Example 6: The system of any of Examples 1-5, wherein the static data comprises application data or log data.

Example 7: The system of any of Examples 1-6, wherein the nonstatic data comprises one or more of: system data, customizing data, or master data.

Example 8: The system of any of Examples 1-7, wherein deleting the trigger comprises automatically deleting the trigger after a first execution of the trigger.

Example 9: A computer-implemented method, comprising:
locking access to a target client;
deleting all target data associated with the target client;
defining a trigger that is executed before a modifying operation on a database table associated with a source client or the target client, wherein the database table comprises static data;
executing the trigger, wherein, based on the trigger identifying a query associated with the modifying operation:
locking access to the database table;
executing an insert operation to insert source data of the source client into the target client;
deleting the trigger;
performing the modifying operation on the target client; and
unlocking access to the database table;
generating a database view of the database table, wherein the database view comprises one or more pointers to the source client;
copying nonstatic data from the source client to the target client using the insert operation; and
unlocking access to the target client after the copying.

Example 10: The computer-implemented method of Example 9, wherein the trigger comprises a structured query language BEFORE trigger.

Example 11: The computer-implemented method of any of Examples 9-10, wherein the modifying operation comprises an insert operator, an update operator, or a delete operator.

Example 12: The computer-implemented method of any of Examples 9-11, wherein locking access to the database table comprises restricting the database table from data interactions in the source client and in the target client.

Example 13: The computer-implemented method of any of Examples 9-12, wherein the database view of the database table points to a table in the source client for both the source client and the target client.

Example 14: The computer-implemented method of any of Examples 9-13, wherein the static data comprises application data or log data.

Example 15: The computer-implemented method of any of Examples 9-14, wherein the nonstatic data comprises one or more of: system data, customizing data, or master data.

Example 16: The computer-implemented method of any of Examples 9-15, wherein deleting the trigger comprises automatically deleting the trigger after a first execution of the trigger.

Example 17: A non-transitory computer readable medium storing instructions, which when executed by at least one data processor, result in operations comprising:
locking access to a target client;
deleting all target data associated with the target client;
defining a trigger that is executed before a modifying operation on a database table associated with a source client or the target client, wherein the database table comprises static data;
executing the trigger, wherein, based on the trigger identifying a query associated with the modifying operation:
locking access to the database table;
executing an insert operation to insert source data of the source client into the target client;
deleting the trigger;
performing the modifying operation on the target client; and
unlocking access to the database table;
generating a database view of the database table, wherein the database view comprises one or more pointers to the source client;
copying nonstatic data from the source client to the target client using the insert operation; and
unlocking access to the target client after the copying.

Example 18: The non-transitory computer readable medium of Example 17, wherein the trigger comprises a structured query language BEFORE trigger.

Example 19: The non-transitory computer readable medium of any of Examples 17-18, wherein the modifying operation comprises an insert operator, an update operator, or a delete operator.

Example 20: The non-transitory computer readable medium of any of Examples 17-19, wherein deleting the trigger comprises automatically deleting the trigger after a first execution of the trigger.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
   at least one data processor; and
   at least one memory storing instructions, which when executed by the at least one data processor, result in operations comprising:
   locking access to a target client;
   deleting all target data associated with the target client;
   defining a trigger that is executed before a modifying operation on a database table associated with a source client or the target client, wherein the database table comprises static data;
   executing the trigger, wherein, based on the trigger identifying a query associated with the modifying operation:
     locking access to the database table;
     executing an insert operation to insert source data of the source client into the target client;
     deleting the trigger;
     performing the modifying operation on the target client; and
     unlocking access to the database table;
   generating a database view of the database table, wherein the database view comprises one or more pointers to the source client;
   copying nonstatic data from the source client to the target client using the insert operation; and
   unlocking access to the target client after the copying.

2. The system of claim 1, wherein the trigger comprises a structured query language BEFORE trigger.

3. The system of claim 1, wherein the modifying operation comprises an insert operator, an update operator, or a delete operator.

4. The system of claim 1, wherein locking access to the database table comprises restricting the database table from data interactions in the source client and in the target client.

5. The system of claim 1, wherein the database view of the database table points to a table in the source client for both the source client and the target client.

6. The system of claim 1, wherein the static data comprises application data or log data.

7. The system of claim 1, wherein the nonstatic data comprises one or more of: system data, customizing data, or master data.

8. The system of claim 1, wherein deleting the trigger comprises automatically deleting the trigger after a first execution of the trigger.

9. A computer-implemented method, comprising:
   locking access to a target client;
   deleting all target data associated with the target client;
   defining a trigger that is executed before a modifying operation on a database table associated with a source client or the target client, wherein the database table comprises static data;
   executing the trigger, wherein, based on the trigger identifying a query associated with the modifying operation:
     locking access to the database table;
     executing an insert operation to insert source data of the source client into the target client;
     deleting the trigger;
     performing the modifying operation on the target client; and
     unlocking access to the database table;
   generating a database view of the database table, wherein the database view comprises one or more pointers to the source client;
   copying nonstatic data from the source client to the target client using the insert operation; and
   unlocking access to the target client after the copying.

10. The computer-implemented method of claim 9, wherein the trigger comprises a structured query language BEFORE trigger.

11. The computer-implemented method of claim 9, wherein the modifying operation comprises an insert operator, an update operator, or a delete operator.

12. The computer-implemented method of claim 9, wherein locking access to the database table comprises restricting the database table from data interactions in the source client and in the target client.

13. The computer-implemented method of claim 9, wherein the database view of the database table points to a table in the source client for both the source client and the target client.

14. The computer-implemented method of claim 9, wherein the static data comprises application data or log data.

15. The computer-implemented method of claim 9, wherein the nonstatic data comprises one or more of: system data, customizing data, or master data.

16. The computer-implemented method of claim 9, wherein deleting the trigger comprises automatically deleting the trigger after a first execution of the trigger.

17. A non-transitory computer readable medium storing instructions, which when executed by at least one data processor, result in operations comprising:
   locking access to a target client;
   deleting all target data associated with the target client;
   defining a trigger that is executed before a modifying operation on a database table associated with a source client or the target client, wherein the database table comprises static data;
   executing the trigger, wherein, based on the trigger identifying a query associated with the modifying operation:
     locking access to the database table;
     executing an insert operation to insert source data of the source client into the target client;
     deleting the trigger;
     performing the modifying operation on the target client; and
     unlocking access to the database table;
   generating a database view of the database table, wherein the database view comprises one or more pointers to the source client;
   copying nonstatic data from the source client to the target client using the insert operation; and
   unlocking access to the target client after the copying.

18. The non-transitory computer readable medium of claim 17, wherein the trigger comprises a structured query language BEFORE trigger.

19. The non-transitory computer readable medium of claim 17, wherein the modifying operation comprises an insert operator, an update operator, or a delete operator.

20. The non-transitory computer readable medium of claim 17, wherein deleting the trigger comprises automatically deleting the trigger after a first execution of the trigger.

* * * * *